(12) United States Patent
Morino (10) Patent No.: US 10,530,949 B2
(45) Date of Patent: Jan. 7, 2020

(54) IMAGE FORMING APPARATUS AND CONTROL METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Shigeru Morino, Numazu Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/903,777

(22) Filed: Feb. 23, 2018

(65) Prior Publication Data
US 2019/0268481 A1   Aug. 29, 2019

(51) Int. Cl.
*H04N 1/00* (2006.01)
*G03G 15/00* (2006.01)

(52) U.S. Cl.
CPC ....... *H04N 1/0057* (2013.01); *G03G 15/6502* (2013.01); *G03G 15/6529* (2013.01); *G03G 2215/00556* (2013.01)

(58) Field of Classification Search
CPC ............. H04N 1/0057; G03G 15/6502; G03G 15/6529; G03G 2215/00556
See application file for complete search history.

(56) References Cited

U.S. PATENT DOCUMENTS

| | | | |
|---|---|---|---|
| 9,201,359 B2 | 12/2015 | Katayama | |
| 2006/0233561 A1 | 10/2006 | Yamaoka | |
| 2014/0086605 A1* | 3/2014 | Yoshida | G03G 15/234 399/45 |
| 2014/0193167 A1 | 7/2014 | Shinohara | |
| 2014/0193169 A1 | 7/2014 | Shinohara | |
| 2014/0255054 A1* | 9/2014 | Katayama | G03G 15/2039 399/69 |

OTHER PUBLICATIONS

Search Report dated Aug. 8, 2019 received in corresponding European application No. 19 15 5963.2, 9 pages.

* cited by examiner

*Primary Examiner* — Iriana Cruz
(74) *Attorney, Agent, or Firm* — Foley & Lardner LLP (57) ABSTRACT

An image forming apparatus includes a conveyance controller and a processor. The conveyance controller controls a conveyance operation for conveying an image forming medium. The processor executes an image quality maintenance operation for maintaining quality in an image forming processing. The processor executes at least a part of the conveyance operation and a part of the image quality maintenance operation in parallel.

14 Claims, 5 Drawing Sheets

IMAGE FORMING APPARATUS AND CONTROL METHOD

FIELD

Embodiments described herein relate generally to an image forming apparatus and a control method.

BACKGROUND

An image forming apparatus is capable of executing a printing operation and a decoloring operation for decolorizing a decolorable recording material. The image forming apparatus executes an operation for maintaining image quality (hereinafter, referred to as an "image quality maintenance operation") in order to suppress the deterioration in a printing quality due to environmental conditions such as temperature or humidity, or an effect of time variation.

However, for such an image forming apparatus, there is a case in which a user who desires to use the image forming apparatus must wait to execute the decoloring operation or the image quality maintenance operation.

DETAILED DESCRIPTION

In accordance with some embodiments, an image forming apparatus comprises a conveyance controller, an image quality maintenance section and an operation controller. The conveyance controller controls a conveyance operation for conveying an image forming medium. The image quality maintenance section executes an image quality maintenance operation for maintaining quality in an image forming processing. The operation controller executes at least apart of the conveyance operation and a part of the image quality maintenance operation in parallel.

Hereinafter, image forming apparatuses of several embodiments are described with reference to the accompanying drawings.

First Embodiment

The arrangement of the image forming apparatus according to the first embodiment is described below with reference to FIG. 1 and FIG. 2.

Figure 1:
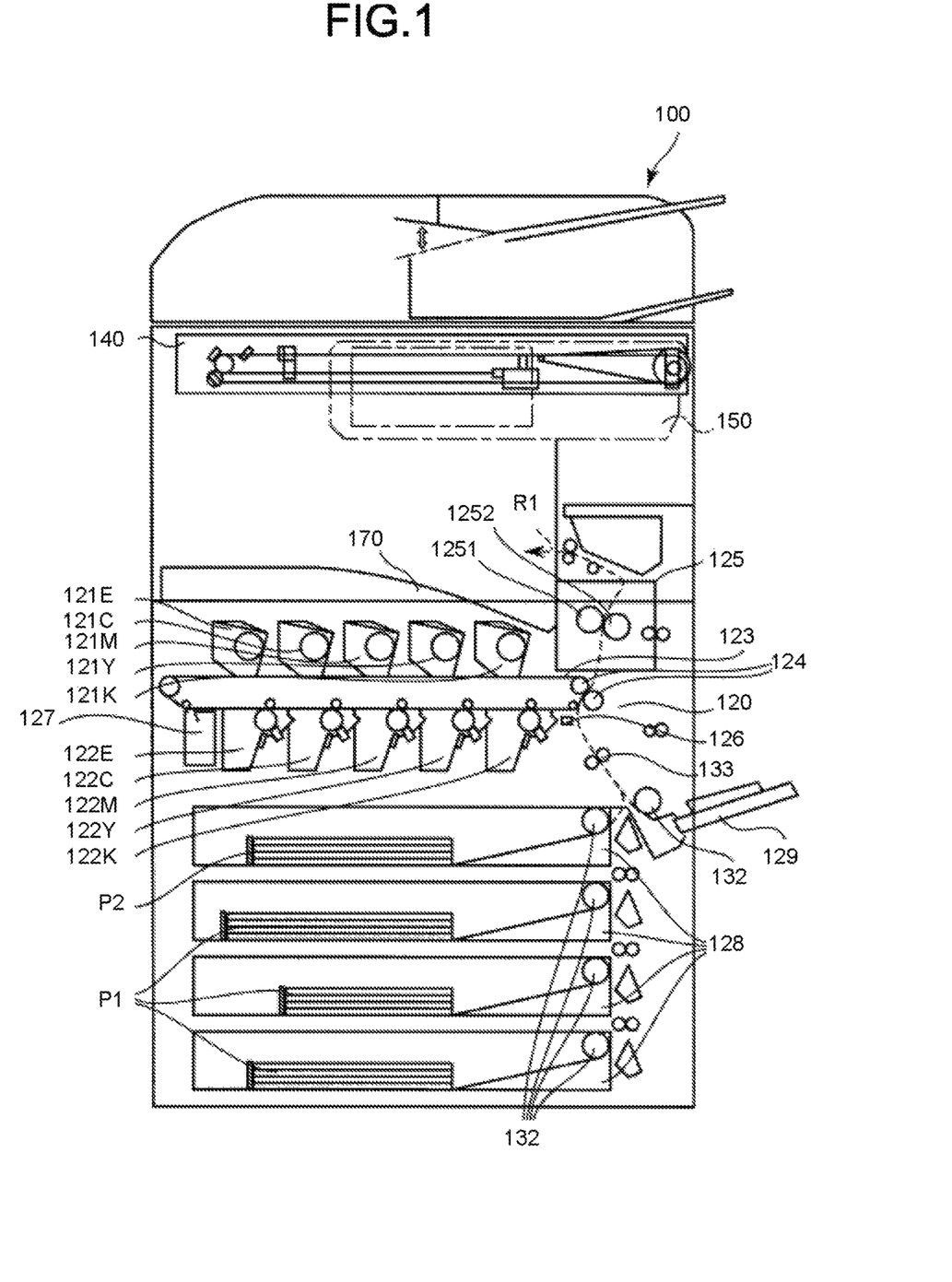
FIG. 1 is a schematic diagram illustrating the outline of an image forming apparatus according to a first embodiment.

FIG. 1 is a schematic diagram illustrating the outline of an image forming apparatus 100 according to the first embodiment.

Figure 2:
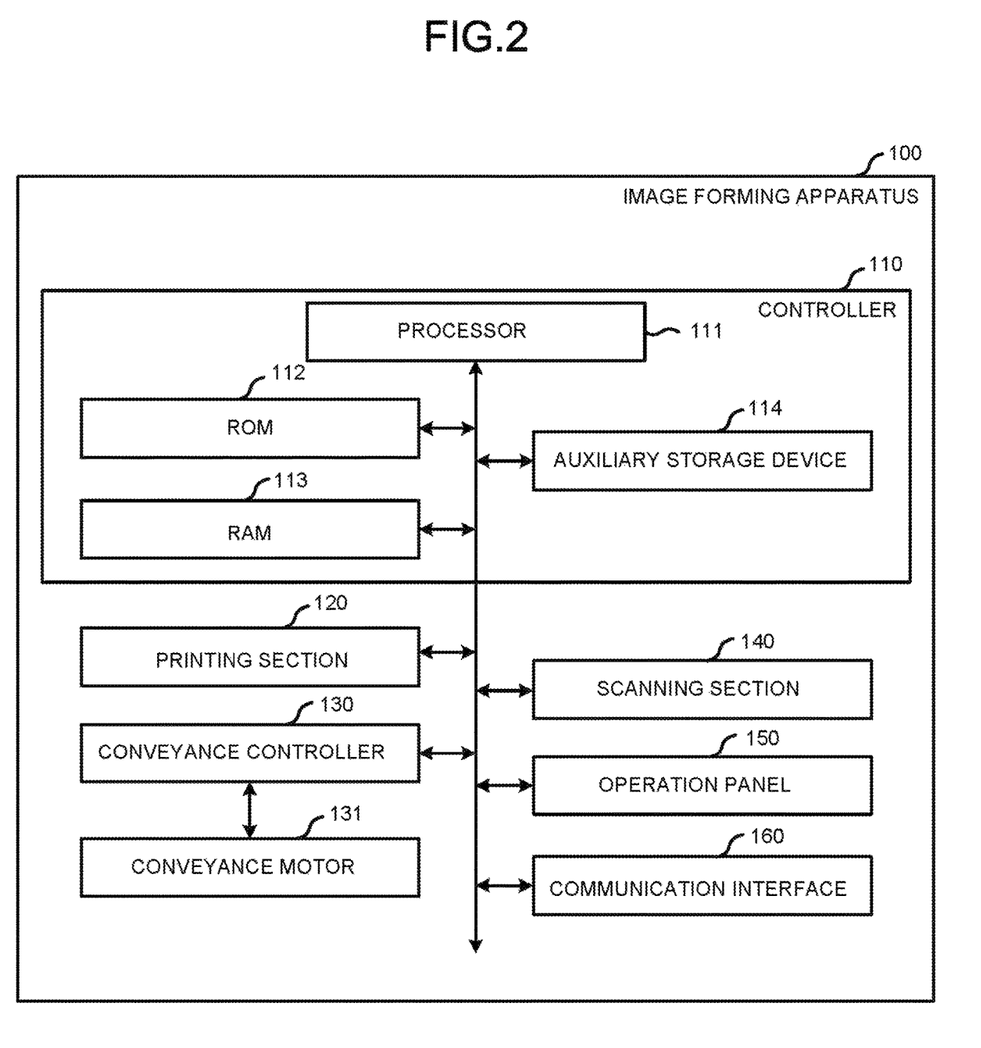
FIG. 2 is a block diagram illustrating the circuit arrangement of main portions of the image forming apparatus according to a first embodiment and a second embodiment.

FIG. 2 is a block diagram illustrating an example of the circuit arrangement of main portions of the image forming apparatus 100 according to the first embodiment.

The image forming apparatus 100 may be, for example, a MFP (Multifunction Peripheral), a copy machine, a printer, a facsimile, or the like. The image forming apparatus 100 is capable of performing various operations such as a printing operation, a scanning operation, a copy operation, a decoloring operation, an image quality maintenance operation, and a facsimile operation. The printing operation refers to an operation of forming an image by using a recording material such as toner on an image forming medium P1. The image forming medium P1 is, for example, a sheet-like paper. The scanning operation reads an image from an original document on which the image is formed. The copy operation refers to an operation of printing an image read from the original document by the scanning operation on the image forming medium P1 by the printing operation. The decoloring operation refers to an operation of decolorizing an image formed by a decolorable recording material on an image forming medium P2. The image quality maintenance operation is an operation of suppressing the deterioration in the printing quality. The image forming medium P2 is a sheet-like paper on which the image is formed with the decolorable recording material. The image forming apparatus 100 may include, by way of example, a controller 110, a printing section 120, a conveyance controller 130, a scanning section 140, an operation panel 150, and a communication interface 160 as shown in FIG. 2.

The controller 110 performs control of the image forming apparatus 100. The controller 110 may include, by way of example, a processor 111, a ROM (read-only memory) 112, a RAM (random-access memory) 113 and an auxiliary storage device 114.

The processor 111 acts as a central part of a computer for performing a processing such as calculation and control necessary for the operation of the image forming apparatus 100. The processor 111 controls each section to realize various functions of the image forming apparatus 100 based on programs such as system software, application software or firmware stored in the ROM 112 or the auxiliary storage device 114. The processor 111 may be, for example, a CPU (Central Processing Unit), a MPU (Micro Processing Unit), a SoC (system on a chip), a DSP (Digital Signal Processor), a GPU (Graphics Processing Unit), an ASIC (Application Specific Integrated Circuit), a PLD (Programmable Logic Device), a FPGA (Field-Programmable Gate Array) or the like. Alternatively, the processor 111 may be a combination of these components. The processor 111 is an example of an operation controller. Alternatively, a computer with the processor 111 as the center is an example of the operation controller.

The ROM 112 acts as a main storage device of the computer with the processor 111 as the center. The ROM 112 is a non-volatile memory exclusively used for reading data. The ROM 112 stores the above programs. The ROM 112 stores data used for the processor 111 to execute various processing or various setting values.

The RAM 113 acts as a main storage device of the computer with the processor 111 as the center. The RAM 113 is a memory used for reading and writing data. The RAM 113 is used as a so-called working area for storing data temporarily used for the processor 111 to execute various processing.

The auxiliary storage device 114 acts as an auxiliary storage device of the computer with the processor 111 as the center. The auxiliary storage device 114 is, for example, an EEPROM (Electric Erasable Programmable Read-Only Memory), a HDD (Hard Disk Drive), a SSD (Solid State Drive), or the like. The auxiliary storage device 114 stores the above program. The auxiliary storage device 114 stores the data used by the processor 111 to execute various processing, data generated by the processing by the processor 111, various setting values, and the like. The auxiliary storage device 114 stores a counter for counting the number of printed sheets after executing the image quality maintenance operation.

The programs stored in the ROM 112 or the auxiliary storage device 114 include a program for executing a processing described later. As an example, the controller 110 is transferred to an administrator of the controller 110 with the program stored in the ROM 112 or the auxiliary storage device 114. However, the controller 110 may be transferred to the administrator in a state in which the program is not stored in the ROM 112 or the auxiliary storage device 114. The controller 110 may be transferred to the administrator with a program different from the program stored in the ROM 112 or the auxiliary storage device 114. A program for executing a processing described later may be separately transferred to the administrator and written into the ROM 112 or the auxiliary storage device 114 under the operation of the administrator or a service person. The transfer of the program at this time can be realized by recording the program in a removable storage medium such as a magnetic disk, a magneto-optical disk, an optical disk, a semiconductor memory or the like, or downloading the program via a network NW.

The ROM 112 or the auxiliary storage device 114 stores necessary ones among threshold values T1 to T15. Each of the threshold values T1 to T15 is determined by a designer, an administrator or a user of the image forming apparatus 100.

The printing section 120 prints an image on the image forming medium P1. As shown in FIG. 1, for example, the printing section 120 includes a toner cartridge 121, an image forming section 122, a transfer belt 123, a transfer roller 124, a fixing section 125, an adhesion amount sensor 126, a cleaning unit 127, a sheet feed tray 128 and a manual feed tray 129.

The toner cartridge 121 stores a recording material to be supplied to the image forming section 122. The image forming apparatus 100 includes one or a plurality of toner cartridges 121. As an example, as shown in FIG. 1, the image forming apparatus 100 includes five toner cartridges 121, i.e., a toner cartridge 121E, a toner cartridge 121C, a toner cartridge 121M, a toner cartridge 121Y, and a toner cartridge 121K. The toner cartridges 121C, 121M, 121Y and 121K store the recording material corresponding to respective colors of CMYK (cyan, magenta, yellow, and key (black)). In other words, the toner cartridge 121C corresponds to cyan, the toner cartridge 121M corresponds to magenta, the toner cartridge 121Y corresponds to yellow, and the toner cartridge 121K corresponds to black. The toner cartridge 121E stores the decolorable recording material which is decolorized at a temperature higher than a predetermined temperature to become an invisible state. The type of the recording material stored in the toner cartridge 121 is not limited to those described here.

The image forming section 122 forms an image on the transfer belt 123 by using the recording material supplied from the toner cartridge 121. Transfer of the image onto the transfer belt 123 by the image forming section 122 is referred to as primary transfer. The image forming apparatus 100 includes one or a plurality of the image forming sections 122. As an example, as shown in FIG. 1, the image forming apparatus 100 includes five image forming sections 122, i.e., an image forming section 122E, an image forming section 122C, an image forming section 122M, an image forming section 122Y and an image forming section 122K. The image forming sections 122O, 122M, 122Y, and 122K form images with the recording material corresponding to respective colors of CMYK (cyan, magenta, yellow, and key (black)). In other words, the image forming section 122C corresponds to cyan, the image forming section 122M corresponds to magenta, the image forming section 122Y corresponds to yellow, and the image forming section 122K corresponds to black. The image forming section 122E forms an image with the decolorable recording material. If an image using plural kinds of recording material such as color printing is formed, a plurality of the image forming sections 122 primarily transfers images onto the transfer belt 123 by superposing the images thereon. As a result, a color image is formed on the transfer belt 123.

The transfer belt 123 may be, for example, an endless belt and is rotatable by the operation of rollers. The transfer belt 123 rotates to convey the image transferred from each of the image forming sections to the transfer roller 124. The transfer belt 123 is an example of a secondary transfer section on which an image for secondary transfer is formed. The image forming apparatus 100 may be provided with a secondary transfer section which does not have a belt shape.

The transfer roller 124 includes two rollers facing each other. The transfer roller 124 rotates by the operation of a motor to transfer an image formed on the transfer belt 123 onto the image forming medium P1. Transfer of the image formed on the transfer belt 123 onto the image forming medium P1 is referred to as a secondary transfer.

The fixing section 125 heats and pressurizes the image forming medium P1 onto which the image is transferred. As a result, the image transferred onto the image forming medium P1 is fixed. The fixing section 125 heats the image forming medium P2. As a result, the image formed on the image forming medium P2 is decolorized. The fixing section 125 includes a heat roller 1251 and a pressure roller 1252 facing each other.

The heat roller 1251 includes a heat source for heating the heat roller 1251. The heat source may be, for example, a heater. The heat roller 1251 is further provided with a thermometer. For example, the thermometer measures the temperature of the heat roller 1251.

The pressure roller 1252 pressurizes the image forming medium P1 passing between the pressure roller 1252 and the heat roller 1251.

The adhesion amount sensor 126 reads an image formed on the transfer belt 123. Then, the adhesion amount sensor 126 outputs information indicating the read result.

The cleaning unit 127 cleans the transfer belt 123. The cleaning unit 127 removes unnecessary recording material generated in the printing operation or the image quality maintenance operation from the transfer belt 123. Furthermore, the cleaning unit 127 collects the removed recording material to store it. The cleaning unit 127 cleans the transfer belt 123 at a position after a position where the transfer belt 123 passes between the transfer roller 124 and the transfer roller 124 (hereinafter, referred to as "between the transfer rollers 124") and before the primary transfer position.

The sheet feed tray 128 accommodates the image forming medium P1 and the image forming medium P2. The image forming apparatus 100 includes one or a plurality of the sheet feed trays 128. The sheet feed tray 128 may include a sensor for detecting that the image forming medium P1 or the image forming medium P2 is accommodated. The sheet feed tray 128 may include a sensor for counting the amount of the image forming medium P1 or the image forming medium P2 accommodated. The amount is, for example, a total weight, the number of sheets or the thickness of the image forming medium P1 or the image forming medium P2 accommodated. The user of the image forming apparatus 100 puts the image forming medium P2 required to be decolorized in the sheet feed tray 128. The determination about which of the image forming medium P1 and the image forming medium P2 is accommodated in the sheet feed tray 128 is based on the designation by the user of the image forming apparatus 100, for example.

The manual feed tray 129 is a table for introducing the image forming medium P1 or the image forming medium P2 into the image forming apparatus 100 by manual feed. The image forming medium on the manual feed tray 129 is conveyed into a housing of the image forming apparatus 100. The manual feed tray 129 may have a sensor for detecting that the image forming medium P1 or the image forming medium P2 is loaded. The manual feed tray 129 may have a sensor for counting the amount of the image forming medium P1 or the image forming medium P2 being loaded. The amount is, for example, the total weight, the number of sheets or the thickness of the image forming medium P1 or the image forming medium P2 being loaded. The determination about which of the image forming medium P1 and the image forming medium P2 is loaded on the manual feed tray 129 may be based on the designation by the user of the image forming apparatus 100, for example.

The conveyance controller 130 controls one or a plurality of conveyance motors 131. The conveyance controller 130 may be, for example, a controller.

The conveyance motor 131 drives each section of the image forming apparatus 100. For example, the conveyance motor 131 drives the transfer belt 123, the transfer roller 124, the heat roller 1251, the pressure roller 1252, a sheet feed roller 132, a conveyance roller 133, and the like.

The sheet feed roller 132 rotates by the operation of the conveyance motor 131 to pick up the image forming media P1 or the image forming media P2 placed on the sheet feed tray 128 or the manual feed tray 129 one by one from the sheet feed tray 128 or the manual feed tray 129.

The conveyance roller 133 rotates by the operation of the conveyance motor 131 to convey the image forming medium P1.

The scanning section 140 reads an image from the original document. The scanning section 140 includes a scanner for reading the image from the original document.

The scanner may be an optical reduction system including an image capturing element such as a CCD (Charge-Coupled Device) image sensor, for example. Alternatively, the scanner may be a contact sensor (CIS (contact image sensor)) system including an image capturing element such as a CMOS (complementary metal-oxide-semiconductor) image sensor. Alternatively, the scanner may be another known system.

The operation panel 150 includes buttons and a touch panel for the operator of the image forming apparatus 100 to operate. The buttons and the touch panel of the operation panel 150 function as an input device for receiving the operation by the operator of the image forming apparatus 100. The touch panel of the operation panel 150 functions as a display device for notifying the operator of the image forming apparatus 100 of various information.

The communication interface 160 is used for the image forming apparatus 100 to perform communication via a communication network such as a LAN (Local Area Network), the Internet, or a public switched telephone network.

The image forming apparatus 100 communicates with a personal computer (PC), a server, a smart phone, or the like via the communication interface 160.

The image forming apparatus 100 includes a sheet discharge tray 170. The sheet discharge tray 170 is a table on which the image forming medium P1 and the image forming medium P2 discharged from the housing of the image forming apparatus 100 are placed.

Figure 3:
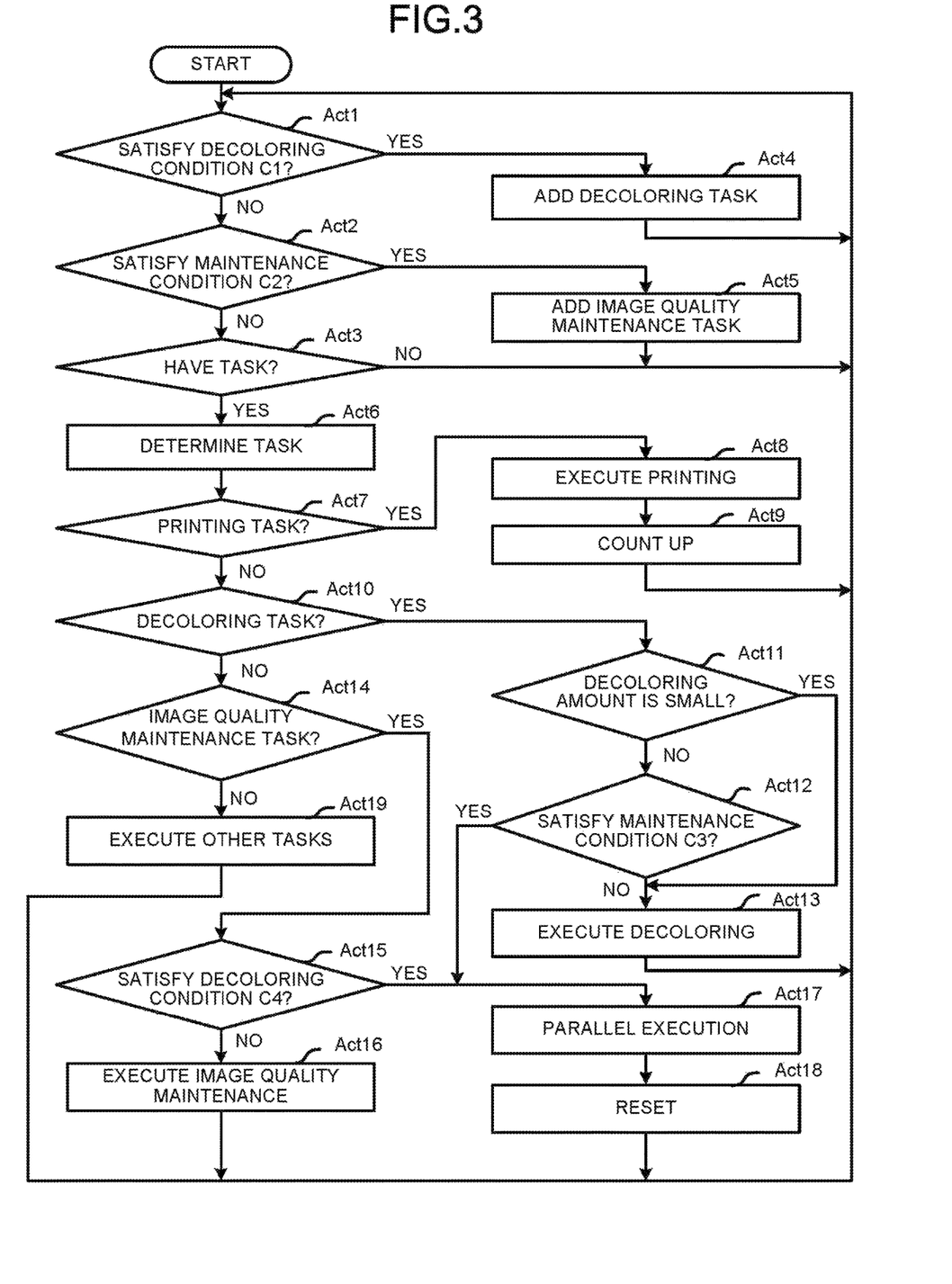
FIG. 3 is a flowchart illustrating a processing according to the first embodiment and the second embodiment by a processor in FIG. 2.

The operation of the image forming apparatus 100 according to the first embodiment is described below with reference to FIG. 3. The content of the processing in the following operation description is merely an example, and various processing capable of achieving the same result can be suitably used. FIG. 3 is a flowchart of processing by the processor 111 of the controller 110. The processor 111 executes the processing based on the program stored in the ROM 112 or the auxiliary storage device 114. Unless otherwise described, the processor 111 proceeds to the processing in Act (N+1) after the processing in Act N (N is a natural number.).

In Act 1, the processor 111 determines whether or not the image forming apparatus 100 satisfies a decoloring condition C1. The decoloring condition C1 is a condition for determining whether to execute the decoloring operation. The decoloring condition C1 may include at least one of the conditions (C11) to (C16) shown below, for example. If it is determined that at least one of the conditions included in the decoloring condition C1 is satisfied, the processor 111 determines that the decoloring condition C1 is satisfied.

(C11) The image forming medium P2 is placed on the sheet feed tray 128 or the manual feed tray 129.

(C12) The image forming media P2 of a predetermined amount T1 or more are placed on the sheet feed tray 128 or the manual feed tray 129.

(C13) After elapse of a predetermined time and the image forming medium P2 is placed on the sheet feed tray 128 or the manual feed tray 129.

(C14) After elapse of a predetermined time and the image forming media P2 of a predetermined amount T2 or more are placed on the sheet feed tray 128 or the manual feed tray 129.

(C15) An operation for instructing execution of the decoloring operation is performed by the operator of the image forming apparatus 100, and the image forming medium P2 is placed on the sheet feed tray 128 or the manual feed tray 129.

(C16) A command, which is sent from the PC or the like and instructs execution of the decoloring operation, is received by the communication interface 160 and the image forming medium P2 is placed on the sheet feed tray 128 or the manual feed tray 129.

If the processor 111 determines that the decoloring condition C1 is not satisfied, the processor 111 determines No in Act 1 and proceeds to the processing in Act 2.

In Act 2, the processor 111 determines whether or not the image forming apparatus 100 satisfies a maintenance condition C2. The maintenance condition C2 is a condition for determining whether to execute the image quality maintenance operation. The maintenance condition C2 may include at least one of conditions (C21) to (C29) shown below, for example. If it is determined that at least one of the conditions contained in the maintenance condition C2 is satisfied, the processor 111 determines that the maintenance condition C2 is satisfied.

(C21) The number of printed sheets after the image quality maintenance operation last time is equal to or greater than a predetermined number of sheets T3.

(C22) A printing amount after the image quality maintenance operation last time is equal to or greater than a predetermined amount T4.

(C23) A time since the image quality maintenance operation last time is equal to or longer than a predetermined time T5.

(C24) An operating time since the image quality maintenance operation last time is equal to or longer than a predetermined time T6.

(C25) A value indicating a magnitude of an environmental change since the image quality maintenance operation last time is equal to or greater than a predetermined value T7. The environmental change is, for example, a temperature change or a humidity change.

(C26) A value indicating a magnitude of the environmental change at the latest given time is equal to or larger than a predetermined value T8.

(C27) An operation for instructing execution of the image quality maintenance operation is executed by the operator of the image forming apparatus 100.

(C28) A command, which is sent from the PC or the like and instructs the execution of the image quality maintenance operation, is received by the communication interface 160.

(C29) The toner cartridge 121 is replaced. Alternatively, the toner is refreshed.

If it is determined that the maintenance condition C2 is not satisfied, the processor 111 determines No in Act 2 and proceeds to the processing in Act 3.

In Act 3, the processor 111 determines whether or not there is an unexecuted task. The unexecuted task is stored in, for example, a queue. If there is no unexecuted task, the processor 111 determines No in Act 3 and returns to the processing in Act 1. Thus, the processor 111 repeats the processing in Act 1 to Act 3 until the decoloring condition C1 is satisfied, the maintenance condition C2 is satisfied, or an unexecuted task is added to the queue.

If it is determined that the decoloring condition C1 is satisfied while in a standby state in Act 1 to Act 3, the processor 111 determines Yes in Act 1 and proceeds to the processing in Act 4.

In Act 4, the processor 111 adds a decoloring task for executing the decoloring operation to the queue.

If it is determined that the maintenance condition C2 is satisfied while in the standby state in Act 1 to Act 3, the processor 111 determines Yes in Act 2 and proceeds to the processing in Act 5.

In Act 5, the processor 111 adds the image quality maintenance task for executing the image quality maintenance operation to the queue.

If there is the unexecuted task in the queue while in the standby state in Act 1 to Act 3, the processor 111 determines Yes in Act 3 and proceeds to the processing in Act 6. Besides the decoloring task and the image quality maintenance task, the tasks may include a printing task as well. The printing task is added to the queue in a case in which the command, which is transmitted from the PC and instructs the execution of the printing, is received by the communication interface 160, for example. Alternatively, the printing task is added to the queue if the operation instructing the execution of the copy or the printing is performed by the operator of the image forming apparatus 100. Alternatively, the printing task is added to the queue even in a case in which facsimile data is received.

In Act 6, the processor 111 determines a task to be executed next from the unexecuted tasks stored in the queue. The task determined here is, for example, a task initially stored in the queue among the unexecuted tasks.

In Act 7, the processor 111 determines whether or not the task determined in Act 6 is a printing task. If the task determined in Act 6 is the printing task, the processor 111 determines Yes in Act 7 and proceeds to the processing in Act 8.

In Act 8, the processor 111 executes the printing according to the contents of the task.

In Act 9, the processor 111 increases a value of the counter stored in the auxiliary storage device 114 by the number of sheets printed in Act 8. The processor 111 returns to the processing in Act 1 after the processing in Act 9.

On the other hand, if the task determined in Act 6 is not a printing task, the processor 111 determines No in Act 7 and proceeds to the processing in Act 10.

In Act 10, the processor 111 determines whether or not the task determined in Act 6 is the decoloring task. If the task determined in Act 6 is the decoloring task, the processor 111 determines Yes in Act 10 and proceeds to the processing in Act 11.

In Act 11, the processor 111 determines whether or not a decoloring amount is small. The decoloring amount is the amount of the image forming medium P2 which is a decoloring object. Therefore, the decoloring amount may be, for example, the amount of the image forming medium P2 accommodated by the sheet feed tray 128. The amount of the image forming medium P2 is measured by a sensor of the image forming apparatus 100. The amount of the image forming medium P2 is measured by, for example, a sensor of the sheet feed tray 128 or a sensor of the manual feed tray 129. If the weight or the thickness of a sheet bundle is equal to or smaller than a predetermined threshold value, the processor 111 determines that the decoloring amount is small. The threshold value is determined by the designer, the administrator, or the operator of the image forming apparatus 100. If it is determined that the decoloring amount is not small, the processor 111 determines No in Act 11 and proceeds to the processing in Act 12.

In Act 12, the processor 111 determines whether or not a maintenance condition C3 is satisfied. The maintenance condition C3 is a condition for determining whether to execute the image quality maintenance operation in parallel with the decoloring operation. The maintenance condition C3 may include at least one condition of conditions (C31) to (C36) shown below, for example. If it is determined that at least one of the conditions included in the maintenance condition C3 is satisfied, the processor 111 determines that the maintenance condition C3 is satisfied.

(C31) The number of printed sheets after the image quality maintenance operation last time is equal to or greater than a predetermined number of sheets T9.

(C32) A printing amount after the image quality maintenance operation last time is equal to or greater than a predetermined amount T10.

(C33) A time since the image quality maintenance operation last time is equal to or longer than a predetermined time T11.

(C34) An operating time since the image quality maintenance operation last time is equal to or longer than a predetermined time T12.

(C35) A value indicating a magnitude of an environmental change after the image quality maintenance operation last time is equal to or greater than a predetermined value T13. The environmental change is, for example, a temperature change or a humidity change.

(C36) A value indicating a magnitude of the environmental change at the latest given time is equal to or greater than a predetermined value T14.

The maintenance condition C3 is preferably looser than the maintenance condition C2. If the maintenance condition C3 is not looser than the maintenance condition C2, the image quality maintenance operation is often executed independently without being executed in parallel with the decoloring operation. The condition that the maintenance condition C3 is looser than the maintenance condition C2 refers to a relationship of magnitudes of the threshold values, i.e., T9<T3, T10<T4, T11<T5, T12<T6, T13<T7 and T14<T8.

If it is determined that the maintenance condition C3 is not satisfied, the processor 111 determines No in Act 12 and proceeds to the processing in Act 13. If the decoloring amount is small, the processor 111 determines Yes in Act 11 and proceeds to the processing in Act 13.

In Act 13, the processor 111 executes the decoloring operation. The processor 111 returns to the processing in Act 1 in response to the end of the decoloring operation.

The processor 111 executes the decoloring operation as follows, for example.

The processor 111 operates the heat source of the heat roller 1251 so that the temperature of the heat roller 1251 becomes a temperature suitable for decolorizing the decolorable recording material. The processor 111 controls the conveyance controller 130 so as to convey the image forming media P2 one after the other placed on the sheet feed tray 128 or the manual feed tray 129. In response, the conveyance controller 130 controls the conveyance motor 131 to drive the transfer belt 123, the transfer roller 124, the heat roller 1251, the pressure roller 1252, the sheet feed roller 132, the conveyance roller 133, and the like. The sheet feed roller 132 conveys the image forming media P2 one after the other out from the sheet feed tray 128 or the manual feed tray 129. An inter-sheet distance between the image forming medium P2 conveyed out at this time and the image forming medium P2 conveyed out next may be constant, for example. Then, the transfer belt 123, the transfer roller 124, the heat roller 1251, the pressure roller 1252 and the conveyance roller 133 convey the image forming medium P2 conveyed out from the sheet feed tray 128 or the manual feed tray 129 in such a manner that the image forming medium P2 passes through a route R1 shown in FIG. 1. The route R1 is a route through which the image forming medium P2 passes through the sheet feed tray 128 or the manual feed tray 129, the transfer roller 124, and the fixing section 125 in order and is discharged to the sheet discharge tray 170. The image forming medium P2 receives the heat from the heated heat roller 1251 at the time of passing through the fixing section 125. As a result, the decolorable recording material on the image forming medium P2 is heated and decolorized. Thus, in the decoloring operation, the conveyance controller 130 executes a conveyance operation for conveying the image forming medium P2.

On the other hand, if the task determined in Act 6 is not the decoloring task, the processor 111 determines No in Act 10 and proceeds to the processing in Act 14.

In Act 14, the processor 111 determines whether or not the task determined in Act 6 is the image quality maintenance task. If the task determined in Act 6 is the image quality maintenance task, the processor 111 determines Yes in Act 14 and proceeds to the processing in Act 15.

In Act 15, the processor 111 determines whether or not a decoloring condition C4 is satisfied. The decoloring condition C4 is a condition for determining whether to execute the decoloring operation in parallel with the image quality maintenance operation. The decoloring condition C4 includes at least one condition of conditions (C41) to (C42) shown below, for example. If it is determined that at least one of the conditions included in the decoloring condition C4 is satisfied, the processor 111 determines that the decoloring condition C4 is satisfied.

(C41) The image forming medium P2 is placed in the sheet feed tray 128 or the manual feed tray 129.

(C42) The image forming media P2 of a predetermined amount T15 or more are placed on the sheet feed tray 128 or the manual feed tray 129.

The decoloring condition C4 is preferably looser than the decoloring condition C1. If the decoloring condition C4 is not looser than the decoloring condition C1, the decoloring operation is often executed independently without being executed in parallel with the image quality maintenance operation. The condition that the decoloring condition C4 is looser than the decoloring condition C1 refers to, for example, a relationship of the magnitudes of the threshold values, i.e., T15<T1.

If it is determined that the decoloring condition C4 is not satisfied, the processor 111 determines No in Act 15 and proceeds to the processing in Act 16.

In Act 16, the processor 111 executes the image quality maintenance operation. The processor 111 returns to the processing in Act 1 in response to the end of the image quality maintenance operation.

The image quality maintenance operation is described. The image quality maintenance operation may include, for example, a density maintenance operation and an alignment operation. The density maintenance operation is used for maintaining the density of the image formed by the image forming section 122. The alignment operation is used for maintaining the accuracy of aligning the positions when the plurality of the image forming sections 122 superimposes the images and transfers them.

The processor 111 executes the image quality maintenance operation as follows, for example. Specifically, the processor 111 controls each of the image forming sections 122 to form an image quality maintenance pattern on the transfer belt 123. The image quality maintenance pattern may include a density maintenance pattern and an alignment pattern. The density maintenance pattern is used for the density maintenance operation. The alignment pattern is used for the alignment operation. The image quality maintenance pattern formed on the transfer belt 123 is read by the adhesion amount sensor 126. The processor 111 acquires the information output by the adhesion amount sensor 126. Then, based on the acquired information, the processor 111 determines whether or not the image quality maintenance pattern is formed in a desired state. Then, based on the determination result, the processor 111 corrects the density of each of the image forming sections 122 if the density maintenance pattern is not in a desired state. Then, based on the determination result, the processor 111 corrects the image forming position of each of the image forming sections 122 if the alignment pattern is not in a desired state. After correction, the processor 111 again performs the above operations since the formation of the image quality maintenance pattern. The processor 111 repeats the above-described operations until the image quality maintenance pattern is formed in the desired state as described above. The above operation is repeated until the image quality maintenance pattern is formed in the desired state, so that a printing quality is in a desired state.

Thus, the processor 111, the image forming section 122, the transfer belt 123 and the adhesion amount sensor 126 cooperate to function as an image quality maintenance section which executes the image quality maintenance operation for maintaining the quality in image formation.

If it is determined that the maintenance condition C3 is satisfied, the processor 111 determines Yes in Act 12 and proceeds to the processing in Act 17. If it is determined that the decoloring condition C4 is satisfied, the processor 111 determines Yes in Act 15 and proceeds to the processing in Act 17.

In Act 17, the processor 111 executes the decoloring operation and the image quality maintenance operation in parallel. The processor 111 proceeds to the processing in Act 18 in response to the end of both the decoloring operation and the image quality maintenance operation. The processor 111 executes the decoloring operation and the image quality maintenance operation in parallel as follows, for example.

Figure 4:
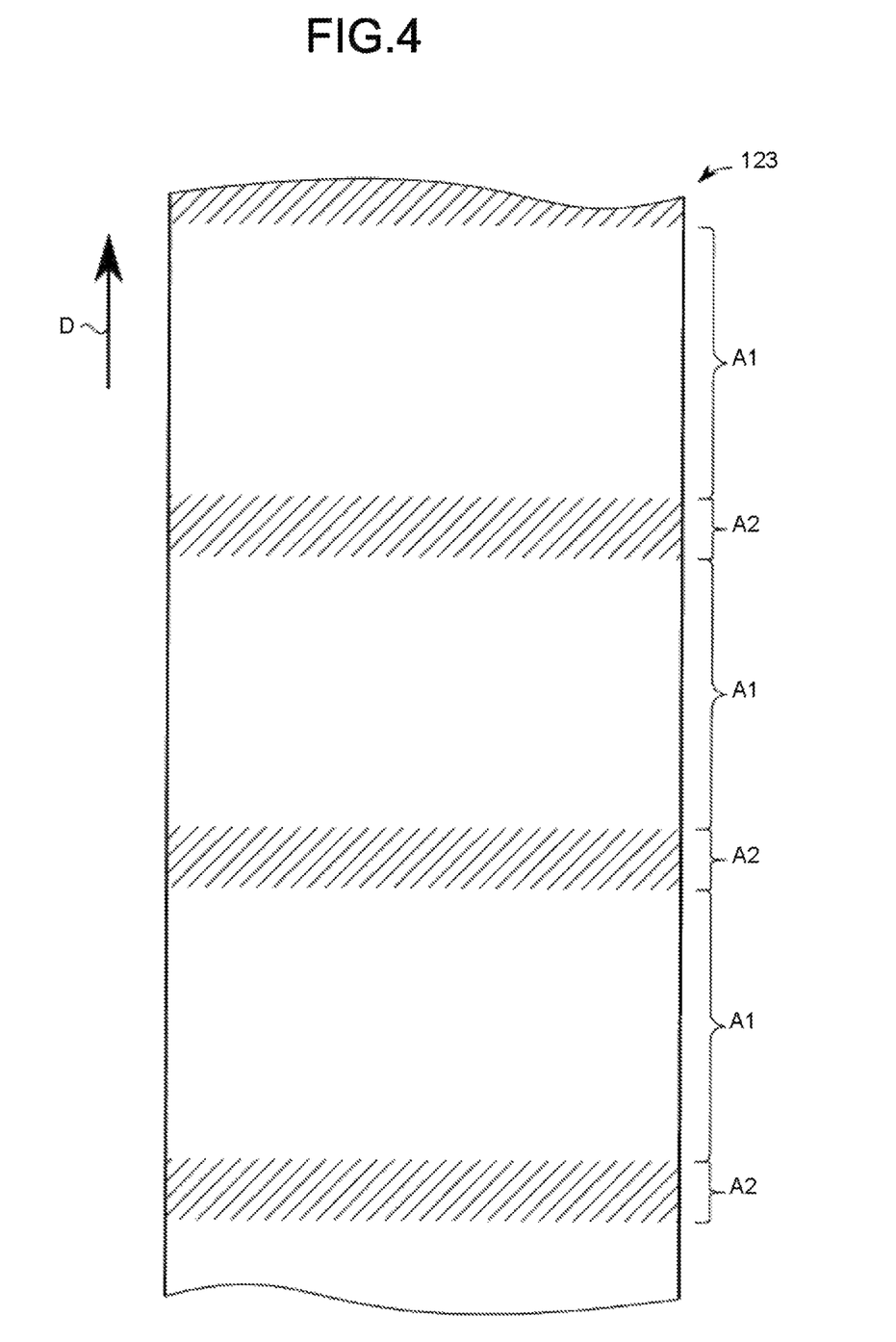
FIG. 4 is a diagram for explaining an image quality maintenance pattern according to the first embodiment which is formed on a transfer belt.

In the image quality maintenance operation, the image quality maintenance pattern is formed on the transfer belt 123. Therefore, at the time of trying to simply perform the decoloring operation during the image quality maintenance operation, the image quality maintenance pattern is secondarily transferred from the transfer belt 123 when the image forming medium P2 passes between the transfer rollers 124. To deal with that, the processor 111 controls the image forming section 122 and the conveyance controller 130 so that the image forming medium P2 conveyed along the route R1 only contacts with a part of the transfer belt 123 where the image quality maintenance pattern is not formed. Therefore, the processor 111 controls the image forming section 122 to form the image quality maintenance pattern as shown in FIG. 4. FIG. 4 is a diagram for explaining the image quality maintenance pattern formed on the transfer belt 123.

The transfer belt 123 is conveyed in a direction D as shown in FIG. 4. In the transfer belt 123, an area A1 and an area A2 are alternately repeated in a conveyance direction. The image forming section 122 forms the image quality maintenance pattern in the area A2 of the transfer belt 123. Then, the image forming section 122 does not form any image in the area A1. The areas A1 and A2 are virtual areas. Therefore, for example, there is a case in which the part which is the area A1 on the transfer belt 123 becomes the area A2 after one turn, and vice versa.

The length in the conveyance direction of the area A1 is the same as that in the conveyance direction of the image forming medium P2. For example, if the size of the image forming medium P2 is A4, the length in the conveyance direction of the area A1 is 210 mm, which is the same as the length of the short side of A4. However, this is a case in which the short side direction of the image forming medium P2 is the conveyance direction.

The length in the conveyance direction of the area A2 is the same as that of the inter-sheet distance of the image forming medium P2. The image forming section 122 preferably does not form the image quality maintenance pattern at a part of the area A2 where the distance from the area A1 is within a certain range. It is preferable to provide a margin in the area A2. This is because if the image quality maintenance pattern is formed up to the part of the area A2 very close to the area A1, the position of the image forming medium P2 is deviated, the image forming medium P2 is inclined, and the position where the image quality maintenance pattern is formed is deviated. Thus, the image quality maintenance pattern is prevented from being secondarily transferred onto the image forming medium P2.

The processor ill controls a conveyance start timing of the image forming medium P2, the inter-sheet distance of the image forming medium P2, and the position of the area A2. With the above operation, the image quality maintenance pattern formed on the transfer belt 123 passes between the image forming medium P2 and the image forming medium P2 between the transfer rollers 124. In other words, the image forming medium P2 passes between the image quality maintenance pattern and the image quality maintenance pattern formed on the transfer belt 123 between the transfer rollers 124. Therefore, even if the decoloring operation and the image quality maintenance operation are executed in parallel, the image quality maintenance pattern formed on the transfer belt 123 is not secondarily transferred onto the image forming medium P2.

In Act 17, similar to Act 13, the processor 111 controls the heat roller 1251 in such a manner that the temperature of the heat roller 1251 becomes the temperature suitable for decolorizing the decolorable recording material. As a result, the image formed on the image forming medium P2 passing through the route R1 is decolorized.

In Act 17, the processor 111 may start executing the image quality maintenance operation after the start of the execution of the decoloring operation, and vice versa, or may start executing the image quality maintenance operation and the decoloring operation at the same time.

In Act 17, the processor 111 may change the length in the conveyance direction of the area A2 and the inter-sheet distance in accordance with the decoloring amount. Specifically, the processor 111 lengthens the length in the conveyance direction of the area A2 and the inter-sheet distance as the decoloring amount increases. The longer the length in the conveyance direction of the area A2 and the inter-sheet distance are, the shorter the time required for the image quality maintenance operation becomes, and the lower the throughput of the decoloring operation becomes. Therefore, by setting the length in the conveyance direction of the area A2 and the inter-sheet distance to appropriate lengths, a time difference between the end of the image quality maintenance operation and the end of the decoloring operation can be reduced. The smaller the time difference becomes, the less the time required for the processing in Act 17 becomes. During the execution of the image quality maintenance operation and the decoloring operation in parallel, the processor 111 may change the length in the conveyance direction and the inter-sheet distance according to the progress state of the image quality maintenance operation and the progress state of the decoloring operation. For example, if it is determined that the image quality maintenance operation is about to be completed earlier than the decoloring operation, the processor 111 shortens the length in the conveyance direction of the area A2 and the inter-sheet distance. Then, if it is determined that the decoloring operation is about to be completed earlier than the image quality maintenance operation, the processor 111 lengthens the length in the conveyance direction of the area A2 and the inter-sheet distance. Changing the length in the conveyance direction of the area A2 corresponds to changing a proportion of an area of a part where the image quality maintenance pattern is formed in the transfer belt 123.

If the image quality maintenance operation and the decoloring operation are out of synchronization in execution of the image quality maintenance operation and the decoloring operation in Act 17, the processor 111 may perform correction to synchronize the image quality maintenance operation with the decoloring operation. In this case, the state of synchronization ideally is that the image forming medium P2 passes between the transfer rollers 124 in such a manner that it only contacts with the area A1 of the transfer belt 123. For example, the processor 111 performs the correction by staggering the positions of the areas A2 or staggering the conveyance timing of the image forming medium P2.

The processor 111 may perform the subsequent image quality maintenance operation without arranging the area A1 in a case in which the decoloring operation ends before the image quality maintenance operation in Act 17. If the decoloring operation ends earlier than the image quality maintenance operation, the processor 111 performs the subsequent image quality maintenance operation in the same manner as the image quality maintenance operation in Act 16. As a result, the image quality maintenance operation is terminated earlier.

The processor 111 may shorten the inter-sheet distance in the subsequent decoloring operation if the image quality maintenance operation ends earlier than the decoloring operation in Act 17. Thus, the decoloring operation is terminated earlier.

In Act 18, the processor 111 resets the value of the counter stored in the auxiliary storage device 114 and sets the number of sheets to zero. For example, the processor 111 resets a timer which measures the time since the execution of the image quality maintenance operation last time to zero second. The processor 111 stores information indicating the current temperature and humidity in the auxiliary storage device 114. The processor 111 returns to the processing in Act 1 after the processing in Act 18.

On the other hand, if the task determined in Act 6 is not the image quality maintenance task, the processor 111 determines No in Act 14 and proceeds to the processing in Act 19.

In Act 19, the processor 111 executes an operation corresponding to the content of the task determined in Act 6. The processor 111 returns to the processing in Act 1 after the processing in Act 19.

The image forming apparatus 100 of the first embodiment executes the image quality maintenance operation and the decoloring operation in parallel. Therefore, the image forming apparatus 100 of the first embodiment can reduce the time required for the image quality maintenance operation and the decoloring operation compared with a case in which the image quality maintenance operation and the decoloring operation are separately executed. The image forming apparatus 100 of the first embodiment executes the image quality maintenance operation and the decoloring operation in parallel, so that it is possible to reduce power consumption compared to a case in which the image quality maintenance operation and the decoloring operation are separately executed. The reason of the parallel execution is that some parts operating in the image quality maintenance operation and the decoloring operation are common.

In the image forming apparatus 100 of the first embodiment, the area A1 is provided so that the secondary transfer is not performed on the image forming medium P2. As a result, the image forming medium P2 can be reused.

If it is determined that the decoloring amount is small in Act 11, the image forming apparatus 100 of the first embodiment does not execute the image quality maintenance operation and the decoloring operation in parallel but performs the decoloring operation alone. If the decoloring amount is small, the decoloring operation is immediately terminated, and thus, even if the image quality maintenance operation and the decoloring operation are executed in parallel, it is thought that there is little effect on reducing the time required for the image quality maintenance operation and the decoloring operation. The processor 111 can prevent this by executing the decoloring operation alone.

Second Embodiment

An image forming apparatus according to the second embodiment is described below with reference to FIG. 5 and FIG. 2.

Figure 5:
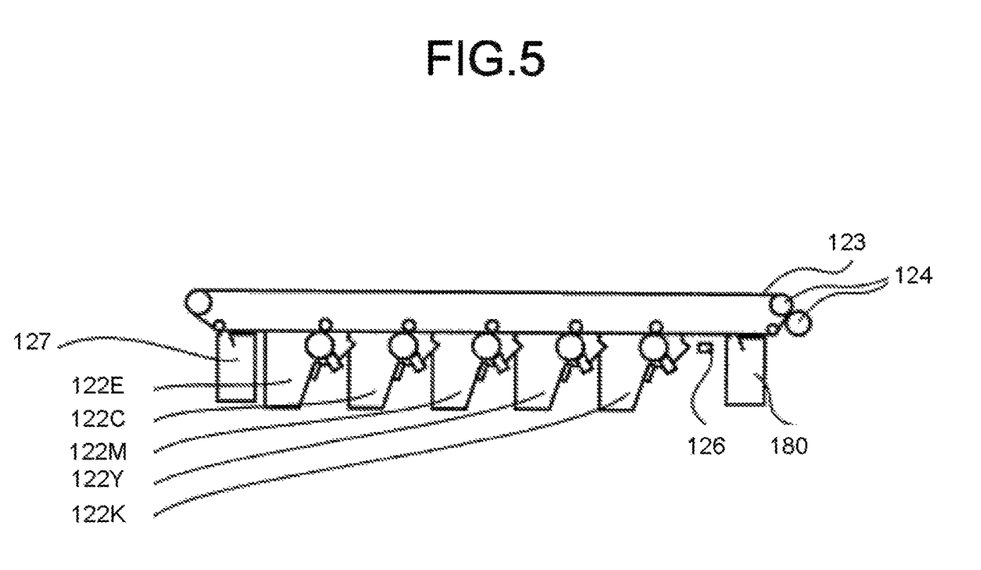
FIG. 5 is a schematic diagram illustrating the outline of the image forming apparatus according to the second embodiment.

FIG. 5 is a schematic diagram illustrating the outline of an image forming apparatus 100b according to the second embodiment. FIG. 5 shows the image forming apparatus 100b without showing the image forming section 122, the transfer belt 123, the transfer roller 124, the adhesion amount sensor 126, the cleaning unit 127 and a cleaning unit 180. The image forming apparatus 100b has the same construction as that of the image forming apparatus 100 shown in FIG. 1 of the first embodiment except for the part shown in FIG. 5.

The image forming apparatus 100b includes the cleaning unit 180 separately from the cleaning unit 127.

The cleaning unit 180 cleans the transfer belt 123 as well as the cleaning unit 127. The cleaning unit 180 cleans the transfer belt 123 at a position located behind a position where the image primarily transferred onto the transfer belt 123 is measured by the adhesion amount sensor 126 and before a position where the transfer belt 123 passes between the transfer rollers 124. The cleaning unit 180 can be switched to two states, an effective state and an ineffective state. The cleaning unit 180 in the effective state cleans the transfer belt 123. The cleaning unit 180 in the ineffective state does not clean the transfer belt 123. Thus, the cleaning unit 180 is an example of a cleaning section that removes the image quality maintenance pattern from the transfer belt 123 before the image quality maintenance pattern is secondarily transferred onto the image forming medium P1.

The circuit arrangement of the main parts of the image forming apparatus 100b is the same as that of the first embodiment shown in FIG. 2, and thus the description thereof is omitted.

The operation of the image forming apparatus 100b according to the second embodiment is described below with reference to FIG. 3. The content of the processing in the following operation description is merely an example, and various processing capable of obtaining the same result can be suitably used. The processor 111 of the image forming apparatus 100b executes the processing shown in FIG. 3 in the same manner as the processor 111 of the image forming apparatus 100 of the first embodiment. However, the operation of the image forming apparatus 100b of the second embodiment is different from that of the image forming apparatus 100 of the first embodiment in the following points. In the second embodiment, the description of the same operation as in the first embodiment is omitted in some cases.

In the second embodiment, the processor 111 sets the cleaning unit 180 to the ineffective state at the beginning of the processing shown in FIG. 3.

In the second embodiment, the processor 111 sets the cleaning unit 180 to the effective state at the start in Act 17. As a result, the image quality maintenance pattern formed on the transfer belt 123 in Act 17 is removed from the transfer belt 123 by the cleaning unit 180 before it is conveyed to a secondary transfer position. Therefore, in the second embodiment, the processor 111 is not necessary to provide the area A1.

The processor 111 sets the cleaning unit 180 to the ineffective state after the processing in Act 17.

The image forming apparatus 100b of the second embodiment removes the image quality maintenance pattern from above the transfer belt 123 before the secondary transfer position. Therefore, the image forming apparatus 100b of the second embodiment does not provide the area A1 on the transfer belt 123. For this reason, the time required for the image quality maintenance operation while the image quality maintenance operation and the decoloring operation are executed in parallel is reduced compared with the first embodiment. The image forming apparatus 100b of the second embodiment does not need to make the inter-sheet distance equal to the length of the area A2 as in the first embodiment. Therefore, the image forming apparatus 100b can shorten the inter-sheet distance as much as possible. Therefore, the throughput of the decoloring operation while the image quality maintenance operation and the decoloring operation are executed in parallel is improved compared with the first embodiment. The image forming apparatus 100b of the second embodiment is not needed to perform precise control for enabling the image quality maintenance pattern formed on the transfer belt 123 to pass between the image forming medium P2 and the image forming medium P2 between the transfer rollers 124.

In the first embodiment and the second embodiment described above, the following modifications are also possible.

If it is determined that the decoloring amount is small when executing the decoloring task, the image forming apparatus 100 of the first embodiment and the image forming apparatus 100b of the second embodiment execute the decoloring operation without executing the decoloring operation and the image quality maintenance operation in parallel. However, the image forming apparatus 100 or the image forming apparatus 100b may execute the decoloring operation and the image quality maintenance operation in parallel even when the decoloring amount is small. In this case, if the processor 111 determines Yes in Act 10, for example, the processor 111 skips the processing in Act 11 and proceeds to the processing in Act 12. In other words, the processor 111 does not determine whether or not the decoloring amount is small.

If it is determined that the decoloring amount is small when executing the decoloring task, the image forming apparatus 100 of the first embodiment and the image forming apparatus 100b of the second embodiment execute the decoloring operation without executing the decoloring operation and the image quality maintenance operation in parallel. However, if it is determined that the decoloring amount is small when executing the decoloring task, the image forming apparatus 100 or the image forming apparatus 100b may execute only a part of the image quality maintenance operation. For example, if the processor 111 determines Yes in Act 11, the processor 111 executes the same processing as Act 12. Then, if the processor 111 determines Yes in the same processing as Act 12, the processor 111 executes the decoloring operation and a part of the image quality maintenance operation in parallel. At this time, the processor 111 executes, for example, the density maintenance operation or the alignment operation as a part of the image quality maintenance operation. After that, the processor 111 returns to the processing in Act 1. The parallel execution of the decoloring operation and a part of the image quality maintenance operation refers to that a part of the image quality maintenance operation is not executed.

The image forming apparatus 100 of the first embodiment and the image forming apparatus 100b of the second embodiment execute the decoloring operation and the image quality maintenance operation in parallel. However, the image forming apparatus 100 or the image forming apparatus 100b may perform operations other than the decoloring operation and the image quality maintenance operation in parallel. However, the operations that the image forming apparatus 100 or the image forming apparatus 100b performs in parallel with the image quality maintenance operation are operations in which the secondary transfer is not executed. For example, the operation that the image forming apparatus 100 or the image forming apparatus 100b performs in parallel with the image quality maintenance operation is a cleaning operation. The cleaning operation is an operation of conveying the blank image forming medium P1 in such a manner that the blank image forming medium P1 passes through the route R1. By the cleaning operation, foreign matters adhering to the fixing section 125 and the like are removed. The foreign matter is, for example, an adhesive used for label paper. Through the above, in the cleaning operation, the conveyance controller 130 executes the conveyance operation for conveying the image forming medium P1. By performing the cleaning operation and the image quality maintenance operation in parallel, the image forming apparatus 100 or the image forming apparatus 100b can reduce the time required for the image quality maintenance operation and the cleaning operation compared with a case of executing the image quality maintenance operation and the cleaning operation separately.

The image forming apparatus 100 or the image forming apparatus 100b may decolorize the decolorable material which is decolorable in a manner different from that of the first embodiment or the second embodiment. For example, the image forming apparatus heats the decolorable material which is decolorable by irradiating the image forming medium P2 with electromagnetic waves such as laser or other light to decolorize the decolorable material.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
    a heater configured to heat an image formed on an image forming medium;
    a conveyance controller configured to control a decoloring operation of decolorizing an image formed by decolorable recording material on a plurality of image forming media; and
    a processor configured to:
        execute an image quality maintenance operation for maintaining quality in an image forming processing during the decoloring operation;
        execute at least heating of the heater by an erasing operation and a part of the image quality maintenance operation in parallel;
        form an image quality maintenance pattern on a secondary transfer section where an image for secondary transfer is formed, and
        form the image quality maintenance pattern in an area corresponding to a distance between the image forming medium in a conveyance direction of the plurality of image forming media in such a manner that the image quality maintenance pattern formed on the secondary transfer section does not contact with the image forming medium.

2. The image forming apparatus according to claim 1, wherein the image quality maintenance operation comprises at least one of an image density maintenance operation or an alignment operation.

3. The image forming apparatus according to claim 1, wherein
the processor is configured to change a proportion of an area of a part where the image quality maintenance pattern is formed in the secondary transfer section.

4. The image forming apparatus according to claim 3, wherein
the area of the part where the image quality maintenance pattern is formed in the secondary transfer section corresponds to an inter-sheet distance of the image forming medium.

5. The image forming apparatus according to claim 3, wherein the processor is configured to increase a length of the area of the part where the image quality maintenance pattern is formed as a decoloring amount of the decoloring operation is increased.

6. The image forming apparatus according to claim 1, wherein
the processor is configured to execute at least a part of the decoloring operation and a part of the image quality maintenance operation in parallel when a predetermined condition for executing the image quality maintenance operation is satisfied at the time of executing the decoloring operation.

7. The image forming apparatus according to claim 6, wherein
when the amount of the conveyed image forming medium is below a predetermined amount, the processor is configured to not execute a part or all of the image quality maintenance operation.

8. The image forming apparatus according to claim 1, wherein
the processor is configured to execute at least a part of the decoloring operation and a part of the image quality maintenance operation in parallel when a predetermined condition for executing the decoloring operation is satisfied at the time of executing the image quality maintenance operation.

9. The image forming apparatus according to claim 1, wherein the processor is configured to start execution of the image quality maintenance operation at the same time or after a start of the decoloring operation.

10. The image forming apparatus according to claim 1, further comprising:
a cleaner arranged to remove the image quality maintenance pattern from the secondary transfer section before an image quality maintenance pattern is secondarily transferred onto the image forming medium.

11. A control method by an image forming apparatus, including:
heating an image formed on an image forming medium;
controlling a decoloring operation of decolorizing an image formed by decolorable recording material on a plurality of image forming media;
executing an image quality maintenance operation for maintaining quality in an image forming processing during the decoloring operation;
executing at least heating by an erasing operation and a part of the image quality maintenance operation in parallel;
forming an image quality maintenance pattern on a secondary transfer section where an image for secondary transfer is formed, and
forming the image quality maintenance pattern in an area corresponding to a distance between the image forming medium in a conveyance direction of the plurality of image forming media in such a manner that the image quality maintenance pattern formed on the secondary transfer section does not contact with the image forming medium.

12. The method according to claim 11, wherein the image quality maintenance operation comprises at least one of an image density maintenance operation or an alignment operation.

13. The method according to claim 11, wherein
at least a part of the decoloring operation and a part of the image quality maintenance operation are executed in parallel when a predetermined condition for executing the image quality maintenance operation is satisfied at the time of executing the decoloring operation.

14. The method according to claim 11, wherein
at least a part of the decoloring operation and a part of the image quality maintenance operation are executed in parallel when a predetermined condition for executing the decoloring operation is satisfied at the time of executing the image quality maintenance operation.

* * * * *